United States Patent
Ishihara et al.

[11] Patent Number: 6,050,108
[45] Date of Patent: Apr. 18, 2000

[54] METHOD FOR PRODUCING GLASS PREFORM

[75] Inventors: Tomohiro Ishihara; Yuichi Ohga; Satoshi Tanaka, all of Yokohama, Japan

[73] Assignee: Sumitomo Electric Industries, Ltd., Osaka, Japan

[21] Appl. No.: 09/149,105

[22] Filed: Sep. 8, 1998

[30] Foreign Application Priority Data

Sep. 8, 1997 [JP] Japan ..................... 9-242823

[51] Int. Cl.[7] ...................... C03B 19/06
[52] U.S. Cl. .................. 65/29.18; 65/32.1; 65/377
[58] Field of Search ................. 65/17.2, 17.4, 65/17.6, 29.12, 29.14, 29.18, 32.1, 377, 422, 426, 29.19, 384

[56] References Cited

U.S. PATENT DOCUMENTS 4,842,628  6/1989  Kreutzer et al. ................. 65/3.12

FOREIGN PATENT DOCUMENTS

| | | |
|---|---|---|
| 232815 | 8/1987 | European Pat. Off. . |
| 523 692 A1 | 1/1993 | European Pat. Off. . |
| 613 866 A1 | 9/1994 | European Pat. Off. . |
| 62-176936 | 8/1987 | Japan . |
| 5-24854 | 2/1993 | Japan . |
| 93/23341 | 11/1993 | WIPO . |

*Primary Examiner*—Karen M. Hastings
*Assistant Examiner*—Sean Vincent
*Attorney, Agent, or Firm*—Pillsbury Madison & Sutro LLP

[57] ABSTRACT

A method for producing a glass preform by synthesizing a porous glass preform by a vapor-phase synthesizing method and heating said porous glass preform in a vacuum or reduced-pressure atmosphere so as to consolidate said porous glass preform, which comprises the steps of: a first step of degassing said porous glass preform to thereby remove gas adsorbed or contained therein; a second step of temporarily contracting said porous glass preform at a temperature higher than a temperature in the first step and lower than a consolidation temperature; and a third step of consolidating said porous glass preform at the consolidation temperature; the degassing of said first step is determined in accordance with the bulk density of said porous glass preform.

7 Claims, 1 Drawing Sheet

METHOD FOR PRODUCING GLASS PREFORM

FIELD OF THE INVENTION

The present invention relates to a method for producing a glass preform, and particularly, to a method for producing a low-loss optical fiber adapted for long distance transmission, and an apparatus for carrying out the method.

BACKGROUND OF THE INVENTION

A porous glass preform synthesized by a vapor-phase synthesizing method such as a vapor-phase axial deposition method, (VAD method) or an outside vapor deposition (OVD method), is subjected to high-temperature heating treatment in an electric furnace consolidating it into a glass preform. Conventionally, a porous glass preform is consolidated to be transparent by several methods, such as a zone heating method and a uniform heating method. In the former method, a transversely shaped porous glass preform is consolidated by passing it through a narrow heating zone under ordinary pressure in an atmosphere of He or He containing a small amount of halogen gas (especially, chlorine). In the latter method, a porous glass preform is put into an electric furnace having a wide heating range and the temperature in the furnace is raised gradually so that the whole length of the porous glass preform is heated evenly in the atmosphere similar to that used in the former method.

For example, in a method for consolidating a porous glass preform, JP-A-62-176936 (The term "JP-A" used herein means an unexamined Japanese patent application) discloses a method in which air, a hydroxyl group and chlorine in the porous glass preform are removed stably with good reproductivity by degassing while adjusting the quantity of of atmospheric gas introduced into a furnace and the quantity of the atmospheric gas exhausted from the furnace, to thereby maintain a constant pressure of the inside of the furnace. JP-A-5-24854 discloses a method in which, in order to obtain a high-quality glass preform small in variation of its outer diameter and little in residual air bubbles upon production of a transparent glass preform by heat treating a porous glass preform in a vacuum or reduced-pressure atmosphere, at least three heat treating steps are conducted: a first step of heat treating the porous glass preform at a temperature so that the porous glass preform is not contracted; a second step of heat treating at a temperature which is higher than the heat treating temperature in the first step and at which the porous glass preform is not consolidated, and a third step of heat treating the porous glass preform at a temperature at which the porous glass preform is consolidated.

When a porous glass preform is degassed and consolidated to be transparent in a vacuum consolidation furnace, gas is apt to remain in the porous glass preform at the time of degassing if the bulk density of the porous glass preform is high. Main components of the gas are water, air, hydrochloric acid, etc. Because the gas fills the gaps between the glass particles in the porous glass preform or is adsorbed on the glass particles, the higher the bulk density is, the more the passage of the gas is clogged greatly so that the gas is hardly drawn out of the porous glass preform.

Such a porous glass preform may cause deterioration in strength and transmission characteristic and, in addition, if heating is further continued to consolidate the glass preform, there is a concern that the gas in the glass preform may expand to cause deformation and explosion of the glass preform. When the degassing time was increased by three times as much as the conventional time, there arose a problem that the productivity was lowered largely, while the degassing per se was carried out sufficiently.

SUMMARY OF THE INVENTION

The present invention is to solve the aforementioned problem.

Accordingly, it is an object of the invention to provide a method for producing a high-quality glass preform efficiently by determining the degassing time in accordance with the bulk density of a porous glass preform used.

Other objects and effects of the present invention will become apparent from the following description.

The foregoing objects can be achieved by the following inventions.

(1) A method for producing a glass preform by synthesizing a porous glass preform by a vapor-phase synthesizing method and heating said porous glass preform in a vacuum or reduced-pressure atmosphere so as to consolidate said porous glass preform, which comprises the steps of:

a first step of degassing said porous glass preform to thereby remove gas adsorbed or contained therein;

a second step of temporarily contracting said porous glass preform at a temperature higher than a temperature in the first step and lower than a consolidation temperature; and a third step of consolidating said porous glass preform at the consolidation temperature, wherein said first step is carried out while the degassing time is determined in accordance with the bulk density of said porous glass preform.

(2) The method for producing a glass preform according to the above aspect (1), wherein said degassing of said porous glass preform is carried out over a period of time determined by the following relational expression between a degassing time and the bulk density of a porous glass preform:

$$\text{Degassing Time (minute)} = A \times \text{Bulk Density (g/cm}^3)$$

wherein A is from 201 to 340.

(3) The method for producing a glass preform according to the above aspect (2), wherein said degassing is carried out at a temperature of from 900 to 1350° C.

(4) The method for producing a glass preform according to any one of the above aspects (1) to (3), wherein the bulk density of said porous glass preform is not lower than 0.6 g/cm$^3$ or greater than 0.8 g/cm$^3$.

(5) The method for producing a glass preform according to any one of the above aspects (1) to (4), carried out by using an apparatus comprising:

a furnace body having a port opening formed in an upper portion thereof for taking in and taking out a preform;

a heater disposed in said furnace body;

a furnace core pipe for isolating said heater and said preform from each other;

an upper cover for sealing said port opening after insertion of said preform;

a radiation thermometer for monitoring a temperature of said furnace core pipe; and an exhaust pump for reducing pressure in said furnace body.

(6) An apparatus for producing a glass preform for carrying out a method according to any one of the above aspects (1) to (4), which comprises:

a furnace body having a port opening formed in an upper portion thereof for taking in and taking out a preform;

a heater disposed in said furnace body;

a furnace core pipe for isolating said heater and said preform from each other;

an upper cover for sealing said port opening after insertion of said preform;

a radiation thermometer for monitoring a temperature of said furnace core pipe; and an exhaust pump for reducing pressure in said furnace body.

DETAILED DESCRIPTION OF THE INVENTION

In the method shown in the above aspect (1), increase in degassing temperature at the first step may bring about acceleration of degassing so long as the degassing temperature is in a certain temperature range. If the degassing temperature exceeds the certain temperature range, the porous glass preform is contracted so that, on the contrary, the degassing does not proceed. The suitable temperature range is from 900 to 1350° C., preferably from 1200 to 1300° C. as described in the above item (3). Accordingly, in degassing the porous glass preform, it is necessary to change the degassing time within the aforementioned temperature range depending on the bulk density of the porous glass preform. The terminology "temporary contraction" means a state before the porous glass preform is consolidated, that is, a state in which the porous glass preform is made dense but not consolidated yet.

The porous glass preform used herein may be prepared by any one of a VAD method, an OVD method, a sol-gel method, etc. Alternatively, a porous glass preform prepared by molding or pressure-molding glass fine particles may be used. The term "porous glass preform" as used herein includes a composite glass preform in which a porous glass preform is synthesized on the outer circumference of a starting glass rod. In this case, the terminology "bulk density" means the weight per unit volume of the porous glass preform excluding the starting glass rod (i.e.: g/cm$^3$).

Preferred Embodiment of the Invention

Figure 1:
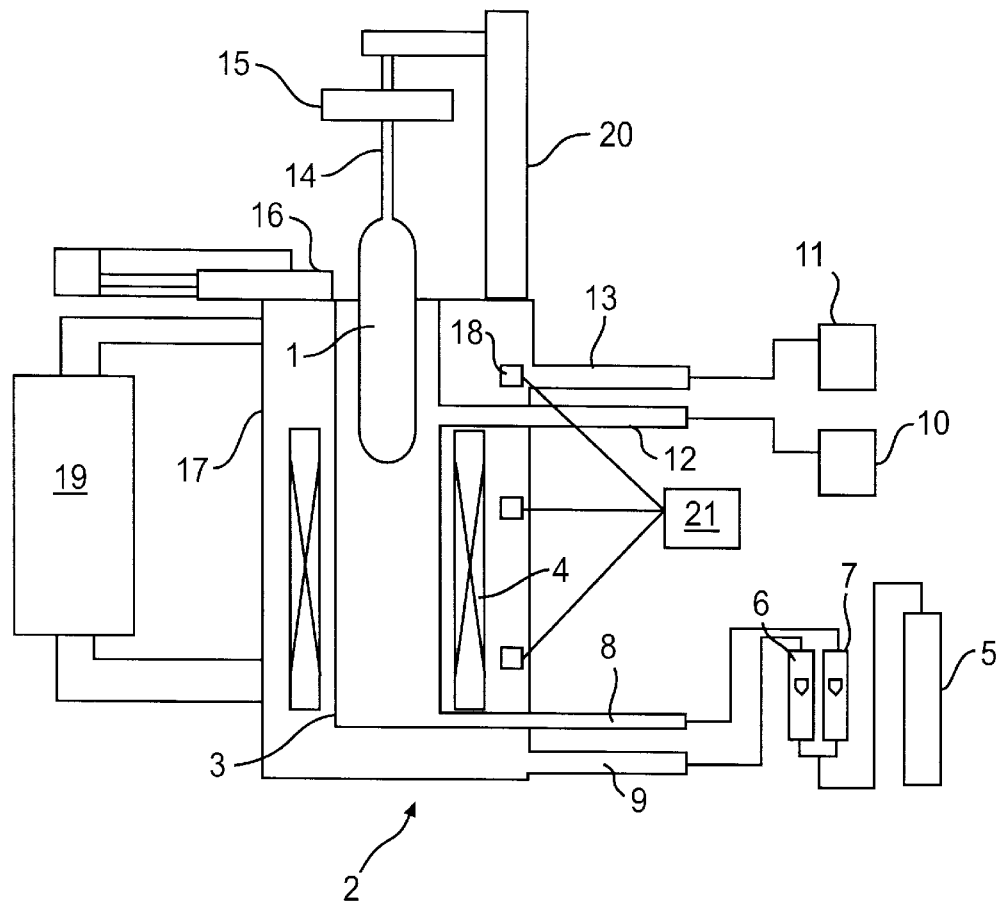
FIG. 1 is a conceptual view showing a vacuum consolidation furnace adapted for carrying out the method of the present invention.

A starting glass rod is prepared, and porous glass is synthesized on the outer circumference of the rod by a VAD method to thereby produce a composite glass preform having a bulk density not lower than 0.6 g/cm$^3$, preferably from 0.6 to 0.8 g/cm$^3$. The composite glass preform is consolidated in a vacuum consolidation furnace configured according to the present invention. As shown in FIG. 1, the vacuum consolidation furnace 2 has a muffle tube 3, a heater 4 surrounding the furnace core pipe 3, an inert gas supply unit 5, inert gas flow meters 6 and 7, ports 8 and 9 for supplying gas into the furnace, suction pumps 10 and 11 for circulating inert gas for keeping the furnace in a vacuum or reduced-pressure atmosphere, pipings 12 and 13 for exhausting gas from the furnace body and the furnace core pipe, a seed rod 14, a furnace body 17, and upper covers 15 and 16 for sealing the furnace body. At the time of cooling, the inside of the furnace body is kept in vacuum or reduced-pressure, or inert gas is circulated in the furnace body under the furnace pressure in a range of from 10$^4$ to 10$^5$ Pa by a forcibly cooling unit 19 and the pumps 10 and 11 for circulating inert gas in the furnace. The furnace temperature is controlled by a temperature monitoring unit 21 to a standby temperature in a range of from 200 to 1000°, preferably from 300 to 700° C. The furnace is sealed by the upper cover 16. At the same time when the upper cover 16 is opened and the porous glass preform 1 is put into the furnace, the furnace is sealed by the upper cover 15 fixed on the upper portion of the seed rod 14. Then, the furnace pressure is reduced to 0.1 to 10 Pa and the furnace temperature is raised at a rate of from 5to 15° C./min to a temperature of from 900 to 1350° C., preferably from 1200 to 1300° C. The furnace temperature is then kept in this temperature range for from 100 to 300 minutes, so that gas adsorbed in the porous glass preform is removed sufficiently (first step).

The furnace temperature is further raised at a rate of from 1 to 10° C. per minute to a temperature of from 1250 to 1450° C. (second step), and then raised to a temperature of from 1460 to 1600° C. and kept at the temperature for from 5 to 60 minutes (third step). Then, the heating by the heater is stopped and the inert gas is introduced into the furnace body. After the pressure in the inside of the furnace body is increased to from 10$^4$ to 10$^5$ Pa, the inert gas is circulated in the furnace by the forcibly cooling unit so that the furnace is cooled.

The reference numeral 18 designates a radiation thermometer; 19, a forcibly cooling unit; 20, a traverse mechanism; and 21, a temperature monitoring unit. Although the drawing shows the case where both of the furnace body and the muffle tube are respectively communicated with gas supply units and gas exhaust units, the invention may be applied also to a case where a gas supply unit and a gas exhaust unit are provided for only one of the furnace body and the furnace core pipe.

Although not shown, valves are provided in the pipings 8, 9, 12 and 13 so that evacuation or gas streaming is carried out by switching-over the valves.

Generally, a porous glass preform synthesized by a vapor-phase synthesizing method has a structure filled with fine particles of from 0.1 to 0.5 μm size. The manner of filling of the fine particles, namely the bulk density, varies depending on the conditions of vapor-phase synthesis. For instance, the smaller the particles are and the higher the temperature is at the time of synthesis, the harder the obtained porous glass becomes since it has less void holes and hence a greater bulk density. The porous glass preform for use in the present invention preferably has a bulk density not less than 0.6 g/cm$^3$, more preferably from about 0.6 to about 0.8 g/cm$^3$. If the bulk density falls below this range, the porous glass preform tends to be broken because it is too soft. On the other hand, if the bulk density exceeds the above range, the glass preform has too much high hardness and therefore, air bubbles already incorporated therein are hardly removed and tend to remain.

Figure 2:
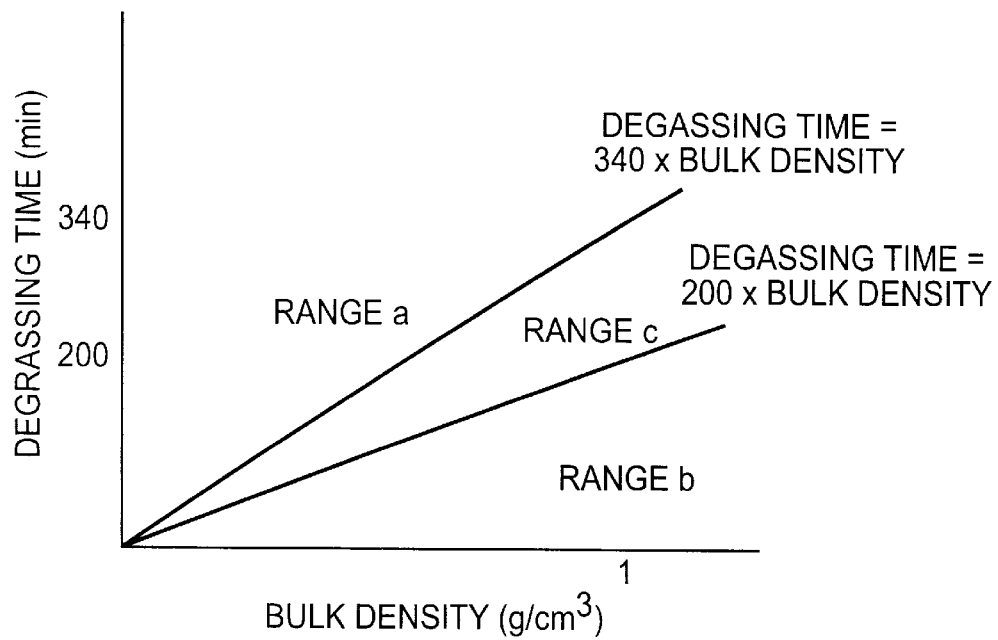
FIG. 2 is a graph showing the relationship between a degassing time and the bulk density of a porous glass preform in relation to the feature of the method of the present invention.

In the present invention, examination was made as to the manner how the consolidation state of the porous glass preform changes with respect to the bulk density of the preform and the degassing time when the porous glass preform was degassed and consolidated in a vacuum consolidation furnace. Thus, as shown in FIG. 2, the optimum range of the degree of degassing of the gas incorporated in the porous glass preform was obtained, thereby obtaining the relational expression between the degassing time and the bulk density of the porous glass preform which follows:

Degassing Time (min)=A×Bulk Density (g/cm³)

wherein A is from 201 to 340.

This is classified into a preferable range and an undesirable range as follows.

Range a

Degassing Time>340×Bulk Density

This is not a preferable range in view of the productivity.

Range b

Degassing Time<201×Bulk Density

This is a range in which products become defective.

Range c

201×Bulk Density≦Degassing Time≦340×Bulk Density

This is a preferable range in which not only a good preform is obtained but also the productivity is good.

The present invention will be described in detail with reference to the following Examples, but the invention should not be construed as being limited thereto.

EXAMPLE 1

An intermediate glass preform was elongated to prepare a starting glass rod of 18 mm. A porous glass preform with an outer diameter of 150 mm was synthesized on the outer circumference of the rod by a VAD method to produce a composite glass preform with a bulk density of 0.8 g/cm³. The preform was consolidated in a vacuum consolidation furnace according to the configuration of the present invention. The vacuum consolidation furnace 2 had a muffle tube 3, a heater 4 surrounding the furnace core pipe, ports 8 and 9 for supplying gas into the furnace, and upper covers 15 and 16 for sealing the furnace body. At the time of cooling, the furnace was kept in a vacuum or reduced-pressure atmosphere, or inert gas was circulated in the furnace body under furnace pressure not smaller than $10^{+4}$ Pa by a forcibly cooling unit 19 and pumps 10 and 11 for circulating inert gas in the furnace. In Example 1, the inside of the furnace was kept at 400° C. by a temperature monitoring unit 21. The furnace was sealed with the upper cover 16. At the same time the upper cover 16 was opened and the preform was put into the furnace, the furnace was sealed with the upper cover 15 fixed on the upper portion of the seed rod 14. Then, the furnace pressure was reduced to 10 Pa by the pumps 10 and 11 and the furnace temperature was raised at the rate of 10° C./min. The inside of the furnace was heated to 1300° C. and kept at 1300° C. for 240 minutes, so that gas adsorbed in the composite glass preform was removed sufficiently. Further, the furnace temperature was raised to a range of from 1500 to 1600° C. at the rate of 3° C./min and kept for 10 minutes. Then, the heating by the heater was stopped and inert gas was introduced into the furnace by the forcibly cooling unit. After the pressure of the inside of the furnace was increased to $10^{+5}$ Pa by the inert gas, the inert gas was circulated in the furnace by the forcibly cooling unit so as to cool the furnace. At the point of time when the furnace temperature reached 400° C., the circulation of the inert gas in the furnace was stopped and the seed rod 14 was lifted up together with the upper cover 15. Then, the furnace was sealed with the upper cover 16. The glass preform taken out was subjected to drawing. As a result, a good fiber having a loss of 0.335 dB/km at 1.3 μm and 0.195 dB/km at 1.55 μm was obtained.

EXAMPLE 2

A porous glass preform prepared by a VAD method and having a diameter of 150 mm and a bulk density of 0.7 g/cm³ was degassed and consolidated by the same apparatus configuration as in Example 1. The inside of the furnace was kept at 400° C. by the temperature monitoring unit 21 and the furnace was sealed with the upper cover 16. At the same time the upper cover 16 was opened and the porous glass preform was put into the furnace, the furnace was sealed by the upper cover 15 fixed on the upper portion of the seed rod 14. Then, the furnace pressure was reduced to 10 Pa by the pumps 10 and 11, and the furnace temperature was raised at the rate of 10° C./min. The inside of the furnace was heated to 1300° C. and kept at 1300° C. for 210 minutes, so that gas adsorbed in the porous glass preform was removed sufficiently. Further, the furnace temperature was raised to a range of from 1500 to 1600° C. at the rate of 3° C./min and then kept for 10 minutes. Then, heating by the heater was stopped and inert gas was introduced into the furnace. After the pressure of the inside of the furnace was increased to $10^{+5}$ Pa by the inert gas, the inert gas was circulated in the furnace by the forcibly cooling unit so as to cool the furnace. At the point of time when the furnace temperature reached 400° C., the circulation of the inert gas in the furnace was stopped and the seed rod 14 was lifted up together with the upper cover 15. As a result, a glass preform having good transparency was obtained.

Although Examples 1 and 2 have shown the case where the standby temperature is 400° C., effective standby temperature is from 200 to 1000° C., preferably from 300 to 700° C.

Although Examples 1 and 2 have shown the case where a composite glass preform and a porous glass preform each produced by a VAD method are used, the same effect as in Examples 1 and 2 can be obtained also in the case where the composite glass preform and porous glass preforms are produced by other methods such as an OVD method, a sol-gel method, etc. Further, the same effect can be obtained also in the case where the composite glass preform and porous glass preforms are produced from glass particles by molding or pressure-molding.

Although Examples 1 and 2 have shown the case where the degassing temperature is 1300° C., the degassing temperature is effectively in a range of from 900 to 1350° C., preferably from 1200 to 1300° C.

Comparative Example 1

An intermediate glass preform was elongated to prepare a starting glass rod of 18 mm. A porous glass preform having an outer diameter of 150 mm was synthesized on the outer circumference of the rod by a VAD method to produce a composite glass preform having a bulk density of 0.8 g/cm³. The composite preform was consolidated in a vacuum consolidation furnace according to the configuration of the present invention. The vacuum consolidation furnace 2 had a muffle tube 3, a heater 4 surrounding the furnace core pipe, ports 8 and 9 for supplying gas into the furnace, and upper covers 15 and 16 for sealing the furnace body. At the time of cooling, the furnace was kept in a vacuum or reduced-pressure atmosphere, or inert gas was circulated in the furnace body, under the furnace pressure not smaller than $10^{+4}$ Pa, by a forcibly cooling unit 19 and pumps 10 and 11 for circulating inert gas in the furnace body. In the Comparative Example 1, the inside of the furnace was kept at 400° C. by a temperature monitoring unit 21, and the furnace was sealed with the upper cover 16. At the same time the upper cover 16 was opened and the composite glass preform was put into the furnace, the furnace was sealed with the upper cover 15 fixed on the upper portion of the seed rod 14. Then, the furnace pressure was reduced to 10 Pa by the pumps 10 and 11, and the furnace temperature was raised at the rate of 10° C./min. The inside of the furnace was heated to 1300° C. and kept at 1300° C. for 60 minutes, so that gas adsorbed in the composite glass preform was removed sufficiently. Further, at 20 minutes after the furnace temperature was raised to a range of from 1500 to 1600° C. at the rate of 3° C./min, there arose a trouble that the glass preform expanded so much as to stick to the furnace core pipe. Such a trouble is considered to have occurred because the duration of 60 minutes in which the temperature of 1300° C. was maintained was too short, and as a result the gas that remained in the glass in the glass preform was caused to expand by the heating temperature for vitrifying the glass preform.

Comparative Example 2

An intermediate glass preform was elongated to prepare a starting glass rod of 18 mm. A porous glass preform having an outer diameter of 150 mm was synthesized on the outer circumference of the rod by a VAD method to produce a composite glass preform having a bulk density of 0.5 g/cm$^3$. However, the composite glass preform could not be produced as a product because cracking occurred in the surface of the composite glass preform in the process of production.

According to the method of the present invention, the degassing step which is a first step is carried out while the degassing time is changed in accordance with the bulk density of a porous glass preform used. Accordingly, the degassing in preforming can be achieved efficiently, so that a high-quality transparent glass substance can be obtained.

While the invention has been described in detail and with reference to specific examples thereof, it will be apparent to one skilled in the art that various changes and modifications can be made therein without departing from the spirit and scope thereof.

What is claimed is:

1. A method for producing a glass preform, comprising the steps of degassing a porous glass preform for a degassing time to thereby remove gas therein wherein the bulk density of said porous glass preform is not lower than about 0.6 g/cm$^3$;

temporarily contracting said porous glass preform at a temperature higher than a temperature in the degassing step and lower than a consolidation temperature; and consolidating said porous glass preform at the consolidation temperature;

wherein the degassing time is determined by the expression $$\text{Degassing Time (minute)} = A \times \text{Bulk Density (g/cm}^3\text{)},$$

wherein A is a value from about 201 to 340.

2. The method for producing a glass preform according to claim 1, wherein said degassing is carried out at a temperature of from 900 to 1350° C.

3. The method for producing a glass preform according to claim 1, carried out with an apparatus comprising:

a furnace body;

a port opening formed in an upper portion in the furnace body;

a heater disposed in said furnace body;

a muffle tube for isolating said heater and said preform from each other;

an upper cover for sealing said port opening after insertion of said preform;

a radiation thermometer for monitoring a temperature of said furnace; and an exhaust pump for reducing pressure in said furnace body.

4. The method for producing a glass preform according to claim 1, wherein the said bulk density of said porous glass preform is not greater than about 0.8 g/cm$^3$.

5. The method of claim 1, farther comprising the steps of:

forcibly cooling the porous glass preform with an inert gas.

6. The method of claim 5, wherein the inert gas has a pressure between about 10$^4$ to 10$^5$ Pa.

7. The of method of claim 1, wherein the degassing time is between about 100 to 300 minutes, based on the bulk density.

* * * * *